United States Patent [19]

Schmidt

[11] 4,122,706
[45] Oct. 31, 1978

[54] APPARATUS FOR COMPUTING THE MEAN INDICATED PRESSURE OF AN ENGINE

[75] Inventor: Oluf R. Schmidt, Kastrup, Denmark

[73] Assignee: Als Burmeister & Wain's Motor-OG Maskinfabrik AF 1971, Copenhagen, Denmark

[21] Appl. No.: 814,891

[22] Filed: Jul. 12, 1977

[30] Foreign Application Priority Data

Jul. 19, 1976 [DE] Fed. Rep. of Germany ....... 2632470

[51] Int. Cl.² .......................................... G01M 15/00
[52] U.S. Cl. ..................................... 73/115; 73/117.3
[58] Field of Search ....................... 73/115, 116, 117.3

[56] References Cited

U.S. PATENT DOCUMENTS

| 3,389,599 | 6/1968 | Beale ....................................... 73/115 |
| 3,503,256 | 3/1970 | List et al. ................................. 73/115 |

*Primary Examiner*—Jerry W. Myracle

*Attorney, Agent, or Firm*—Bacon & Thomas

[57] ABSTRACT

An apparatus for measuring instantaneous values of pressure in the cylinders of a reciprocating engine and-/or for computing the mean indicated pressure. A transducer associated with each cylinder senses the pressure at moments determined by sensing means co-operating with markings provided on a part of the engine, which effects a reciprocating movement synchronously with the movement of the piston. The markings may have the shape of equidistantly disposed teeth of uniform width and may be provided on the piston rod or on a piston coolant carrying telescopic tube. The sensing means may be of an inductive type which generates control pulses whenever a marking is passing by. The signals from the transducer and the sensing means are transmitted to an electronic calculator associated with a display for computing and visualizing the mean indicated pressure and other engine parameters.

9 Claims, 4 Drawing Figures

APPARATUS FOR COMPUTING THE MEAN INDICATED PRESSURE OF AN ENGINE

BACKGROUND OF THE INVENTION

The present invention relates to an apparatus for measuring instantaneous values of pressure in the cylinders of a reciprocating engine and/or for computing the mean indicated pressure by integration of the pressure as a function of the piston travel; the apparatus includes transducer means for sensing said pressure at moments determined by sensing means co-operating with markings provided on a part of the drive system of the engine and electronic calculator means to which said transducer and said sensing means are coupled.

A prior art device of this above mentioned type (it is delivered by the Norwegian firm Autronica A/S in Trondhjem) includes a storage oscilloscope for plotting for each cylinder its dynamic characteristic or indicator diagram, which shows the interrelation between the cylinder pressure and the piston travel, and a display means for displaying the mean indicated pressure computed by means of the electronic calculator means and the pressure at predetermined points of said indicator diagram such as the compression pressure and the maximum combustion pressure.

In said prior art device the markings determining the sensing moments of the pressure transducer are provided on a circumferentially disposed band strapped on one end of the crankshaft in such a way that the sensing is taking place at predetermined angular positions of said one end of the crankshaft. Consequently, an electronic device is required, which for each cylinder is able to perform a transformation of the actual crankshaft angle to the corresponding piston position, which measure complicates the device as a whole. The above prior art device has a further important disadvantage in that during operation of the engine the crankshaft is subjected to torsional deformations, part of which are static deformations, the magnitude of which depends on the actual load of the engine and which generally increase with the distance from the band containing the markings to the cylinder, in which the pressure is measued, and part of which are dynamic deformations, which are due to the torsional vibrations of the crankshaft, the amplitudes of said vibrations being dependent on the load as well as on the rate of revolutions. The hereby implied indefiniteness of the relation between the crankshaft angle at the markings and the position of the piston in the individual cylinders leads to a corresponding inexactitude of the measured values read.

BRIEF SUMMARY OF THE INVENTION

It is an object of this invention to provide an apparatus in which the inexactitude of measurement is reduced substantially and which apparatus is much more simple than the prior art device.

This object is attained according to the invention by providing for each cylinder a set of markings, which are provided on a part of the engine rigidly connected to the piston belonging to the cylinder concerned, and which effects a reciprocating movement synchronous with the movement of the piston.

The increased accuracy attained is primarily due to the fact that by disposing the markings in direct connection with the individual cylinder and on a machine part performing a movement identical with the piston travel there is established for each cylinder an immediate correlation between each instant in which the pressure in the cylinder concerned is sampled or sensed, and the position between the deadcentres of the piston travel, which the piston assumes at the sensing instant. Among other things, the effects of the torsional deformations of the crankshaft, which are more or less unpredictable, are completely avoided and a great accuracy of the result of measurement is achieved whether it is a question of sensing the pressure at preselected points on the indicator diagram or of calculating the mean pressure during an operation cycle. The electronic equipment is simplified because no transformation of a crank angle to a piston position in the individual cylinders is required.

The markings may be provided on the piston rod of each cylinder, e.g. on a scale provided on the piston rod, which feature establishes the most immediate correlation between the markings' passage of the sensing means and the travel of the piston. In some cases it might be undesirable, for instance because of the question of mechanical strength, to employ the piston rod as a carrier of the markings, which then may be provided on a special machine part, which can be fastened to the piston or in the case of a crosshead-type engine to the crosshead.

In the case that each cylinder is provided with a telescopic tube for carrying piston coolant the markings may be provided on said telescopic tube. By this feature an already existing machine part is utilized for the provision of the markings and since substantial mechanical stresses normally do not occur in a telescopic tube of this kind the markings can be provided by machining the outer surface of the tube, and consequently with a high precision.

The markings may especially be constructed as equidistantly disposed teeth of uniform width which are provided on the outer surface of said telescopic tube, and the sensing means may be of an inductive type. This embodiment generates two position signals each time a tooth passes the sensing means, viz. by the passage of the leading edge and of the trailing edge, respectively of the individual tooth, hence the pressure can be measured at correspondingly short intervals.

The sensing means may appropriately be mounted in the wall of a packing sleeve, through which said telescopic tube extends into the engine, and which sleeve is centered by means of said tube. In this region of the engine there is a good accessibility for bringing the sensing means in close proximity to the markings on the telescopic tube and for carrying a signal line out from said sensing means. The centering of the sleeve relative to the tube ensures that a desired distance between the surface of the tube and the sensing means can be maintained.

The sensing means may be mounted excentrically and rotatably in an insert in the wall of said packing sleeve. This makes it possible to adjust exactly the axial position of the sensing means relative to the markings and hereby to equalize variations of the longitudinal position of the markings on said tube and of the connection between said tube and the piston.

The integration of the area defined by the indicator diagram, which forms the basis for the calculation of the mean indicated pressure, is in practice carried out as a summation of the ordinates of said diagram, i.e. the cylinder pressure, in connection with a change of sign each time the piston reaches one of its two dead centres. In a two-stroke type of engine the changes of sign can be made in a simple and secure manner when said machine part having said markings is free from markings in a longitudinal region adjacent the position, which corresponds to the bottom dead centre of the piston, and when further the electronic calculator means comprises switch means for changing, during the passage of said marking-free region, the sign of the measuring value originating in said transducer means and a counting means for changing again said sign of the measuring value after having received a predetermined number of signal pulses from said sensing means. Here one takes advantage of the fact that the cylinder pressure around the bottom dead centre is practically constant and therefore does not contribute to the area defined by the indicator diagram; so that at the most a negligible error is introduced by omitting any measuring of the pressure in this region. Having a precisely defined basis for the measurements during the compression stroke the subsequent change of sign at the top dead centre is determined with the same exactness as the counter has received from the sensing means a number of signal pulses which correspond to the piston stroke.

The switch means may be controlled through an OR-gate means having two input terminals connected to said counting means and to a delay circuit means, respectively. Then a signal ordering a change of sign at the bottom dead centre will occur if no signal has arrived from the sensing means within the delay period, i.e. when the sensing means co-operates with said marking-free region. On the other hand, the change of sign at the top dead centre has to occur solely under the control of the counting means. Normally, this does not cause any trouble if the engine in question has to operate within a relatively limited interval of rotational speeds because it is possible, due to the almost constant cylinder pressure around the bottom dead centre to make the length of the marking-free region substantially longer than the distance between two marking signals. However, the time lag of said delay circuit means may depend on the rpm. or rate of rotations of said engine in order to further prevent an unintended activation at said top dead centre of said switch means induced by said delay circuit means.

BRIEF DESCRIPTION OF THE DRAWINGS

The invention will be readily understood by the following description in connection with the accompanying drawings, in which.

DETAILED DESCRIPTION

Figure 1:
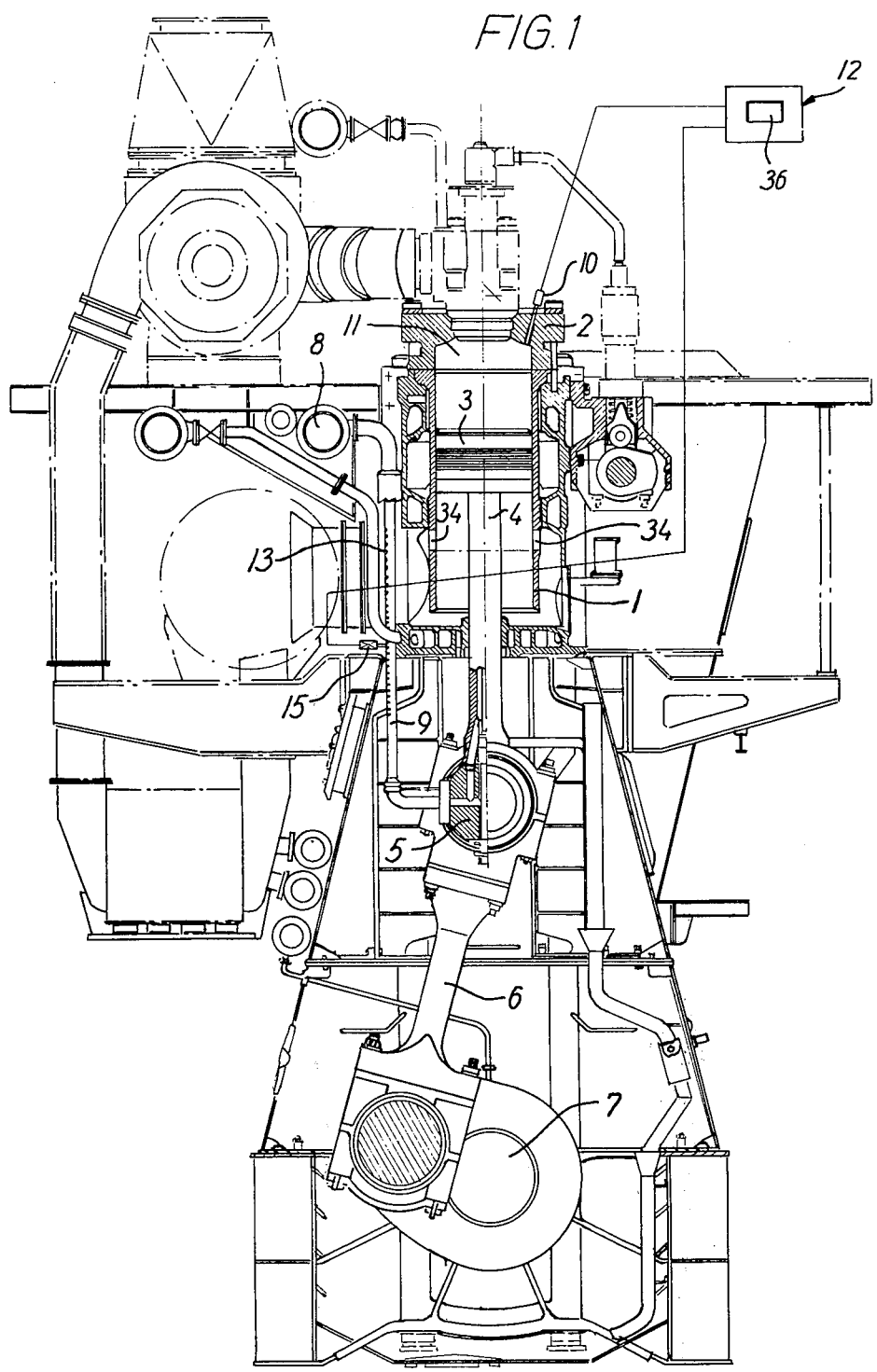
FIG. 1 is a vertical section of a two-stroke type Diesel engine equipped with an embodiment of an apparatus according to the invention.

Referring to FIG. 1 there is shown a cylinder section of an engine comprising a cylinder liner 1 with an associated cylinder cover 2 and piston 3, which through a piston rod 4 is connected to a crosshead 5. The crosshead 5 is through a connecting rod 6 connected to the crankshaft 7 of the engine. A piston coolant is supplied from a stationary distributor 8 and flows through a telescopic tube 9, which is fixedly connected to the crosshead 5, and further through passages in the crosshead and the piston rod 4 to the piston 3.

A pressure transducer 10 is mounted in the cylinder cover 2, which transducer senses the pressure in the combustion chamber 11 above the piston 3 and delivers to an electronic calculator 12 an analogue voltage signal, the amplitude of which is proportional to the working pressure in said chamber 11. The pressure transducer is preferably of a piezoelectric type, but other suitable transducers, e.g. based on the strain-gauge technique, may be employed.

Figure 2:
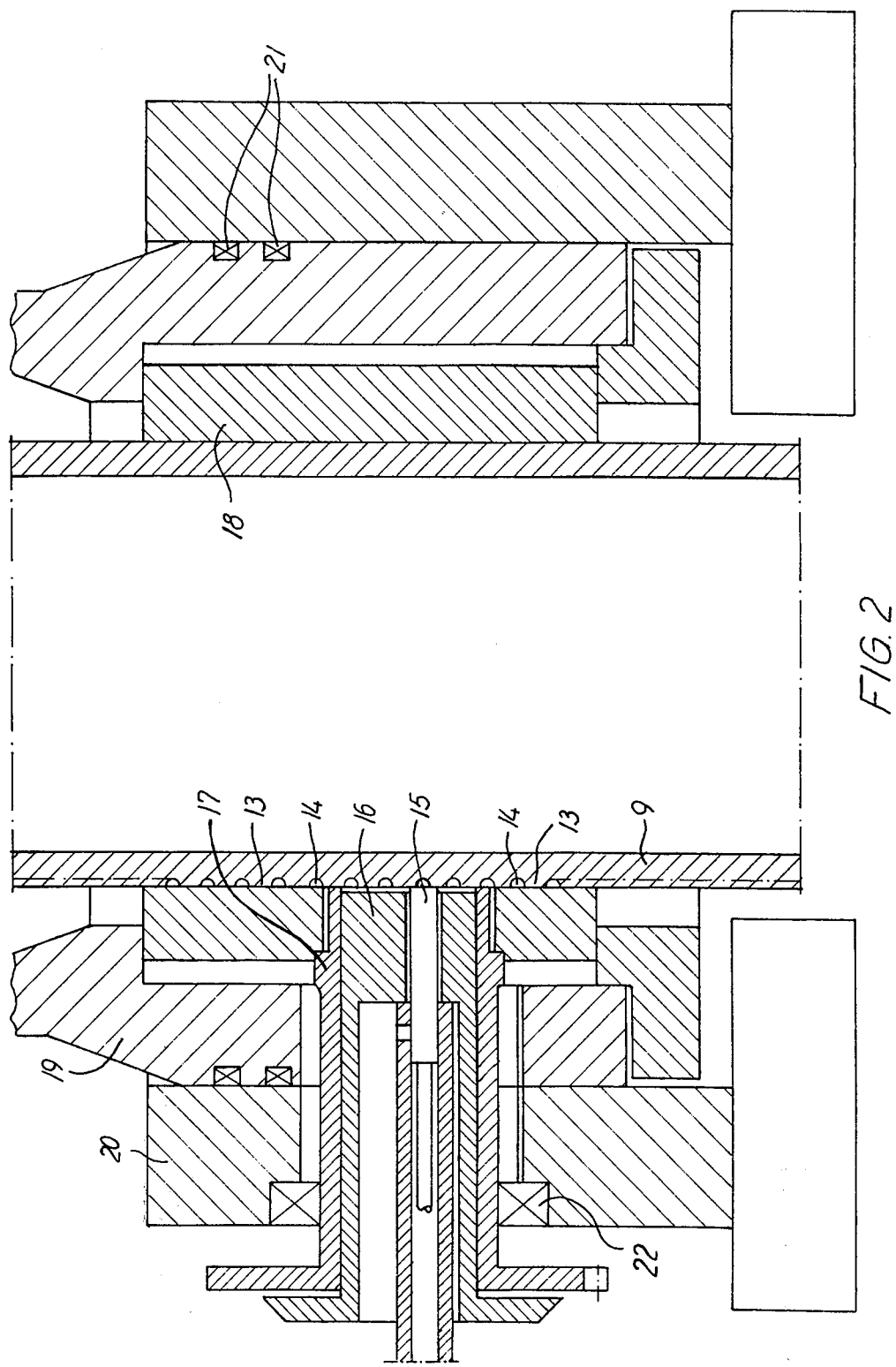
FIG. 2 is a vertical section on a much enlarged scale of a telescopic tube provided with markings for the piston travel and a packing sleeve associated herewith, in which sleeve is mounted a sensing means for the detection of the markings.

The outer surface of the telescopic tube 9 is provided with markings 13 in the form of transverse "teeth", which are mutually separated by milled, equidistantly disposed grooves 14. The teeth 13 and the grooves 14 are provided on a length of the telescopic tube, which is slightly shorter than the stroke of the piston 3, and for the detection of passage of the teeth there is provided a sensing means 15, preferably of the inductive type, which in a manner not particularly shown is mounted in a horizontal bushing 16, which is rotatably supported by an outer sleeve 17, which is threaded into the wall of a vertical packing sleeve 18 surrounding the telescopic tube 9. The packing sleeve 18 is mounted with a radial gap in an outer tube 19 to permit it to follow without hindrance possible transverse displacements of the telescopic tube 9. The outer tube 19 is by means of sealing rings 21 sealed against a part of the frame 20 of the engine and with the aid of another sealing ring 22 the horizontal insert 17 is sealed against the frame 20. As it appears from FIG. 2 the axis of the sensing means 15 is located eccentrically relative to the axis of the contacting surfaces of the bushings 16 and 17. Rotation of bushing 16 permits an exact adjustment of the vertical position of the sensing means 15 relative to the markings 13 on the telescopic tube 9. Locking means (not shown) are provided for securing said bushing 16 after its adjustment.

During the movement of the piston 3 up and down in the cylinder the telescopic tube 9 performs a movement syncronous herewith, whereby the marking teeth 13 are passing closely by the sensing means 15. Each time a tooth is passing by the sensor two electrical pulses are generated, the first one by the passage of the leading edge of the tooth concerned and the second one by the passage of the trailing edge of said tooth. These impulses are employed to control the sensing of the pressure in the combustion chamber 11. In order to secure the generation of the said two control pulses the grooves 14 need only to be as deep as the differences of the voltage levels or of the pulse amplitudes of the output signal of the sensor 15 becomes unfailingly detectable. In practice the depth of the grooves may be about 1.5 mm while the width of the teeth 13 may be approximately 2 mm and the width of the grooves 14 may be approximately 4 mm. Hereby is generated a control pulse each time the piston has travelled 3 mm.

Figure 3:
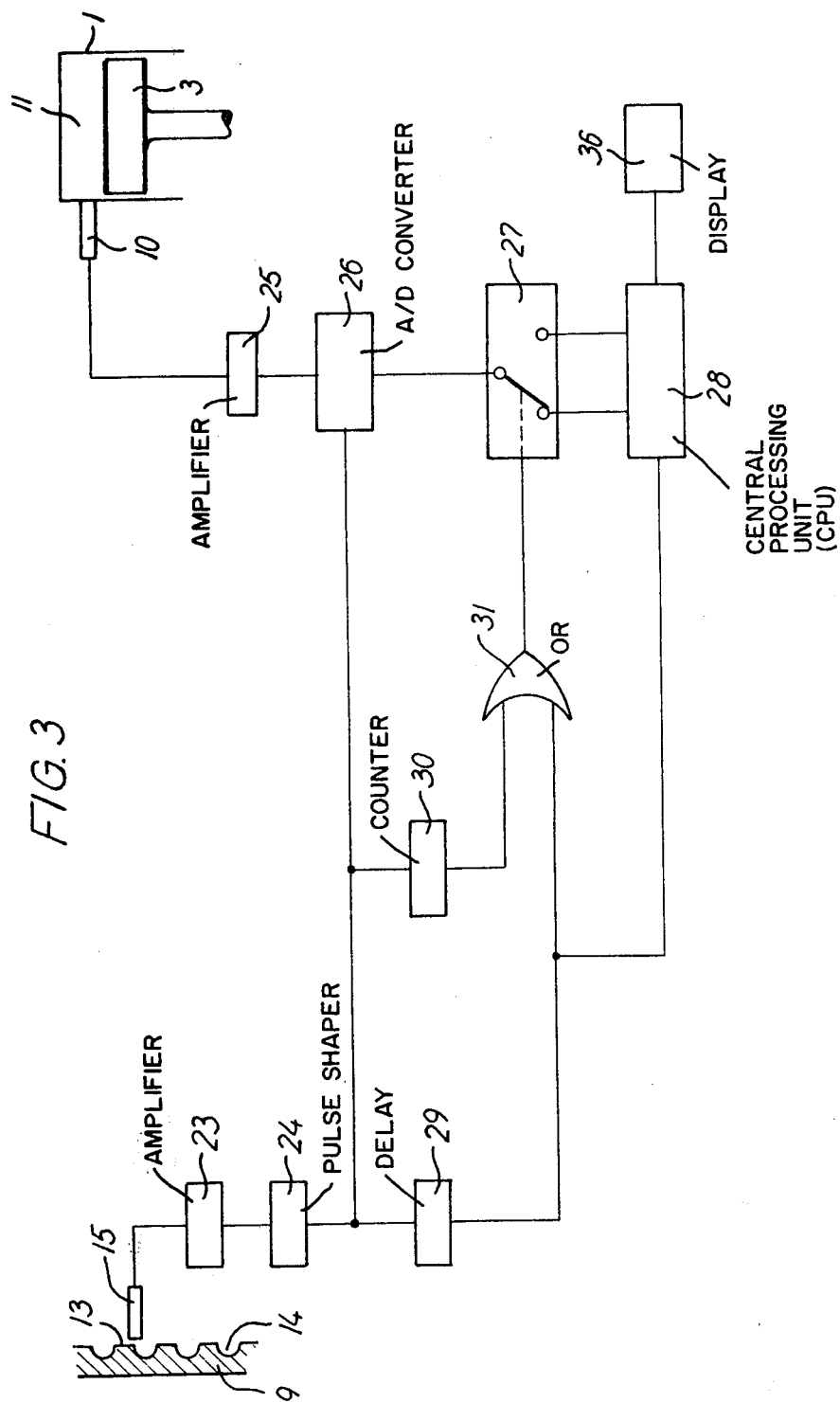
FIG. 3 is a block diagram of the apparatus.

Referring to FIG. 3 the pulse signal from the sensor 15 is applied through an amplifier 23 to a pulse shaping circuit 24, which as an output signal generates a square wave signal. The signal from the pressure transducer 10 is applied through an amplifier 5 to an analog/digital converter 26, in which the analog voltage signal from the transducer is converted into a digital output signal. The converter 26 is connected to the output terminal of the pulse shaping circuit 24 to digitalize the pressure sensed by the transducer 10 each time a pulse arrives from the pulse shaping circuit 24, i.e. whenever the piston 3 has moved a distance corresponding to one half the pitch of the teeth 13.

The digital signals from the converter 26 are transmitted through an electronic switch 27 to a central processing unit 28, in which said signals are accumulated and are processed in accordance with a program stored in the unit. Central processing units are known in the art and will therefore not be described in details herein.

The central processing unit 28 has two input terminals, a first one of which for receiving digital signals picked-up during the compression stroke of the piston 3, and a second one of which for receiving digital signals picked-up during the expansion stroke of said piston. For calculating the mean indicated pressure it is necessary to reckon the first mentioned signals with negative signs and the last mentioned signals with positive signs. Thus the electronic switch 27 has to produce a change of sign whenever the piston is positioned in any of its two dead centres, and this is accomplished in the following manner.

The output terminal of the pulse shaping circuit 24 is connected to a delay circuit 29 and to a counter 30, the outputs of which are connected individually to an input terminal of a 2-input OR-gate 31, the output terminal of which is connected to the switch 27. The output signal from the delay circuit 29 is further applied to the processing unit 28, which is triggered by the signal arriving from the delay circuit 29.

Figure 4:
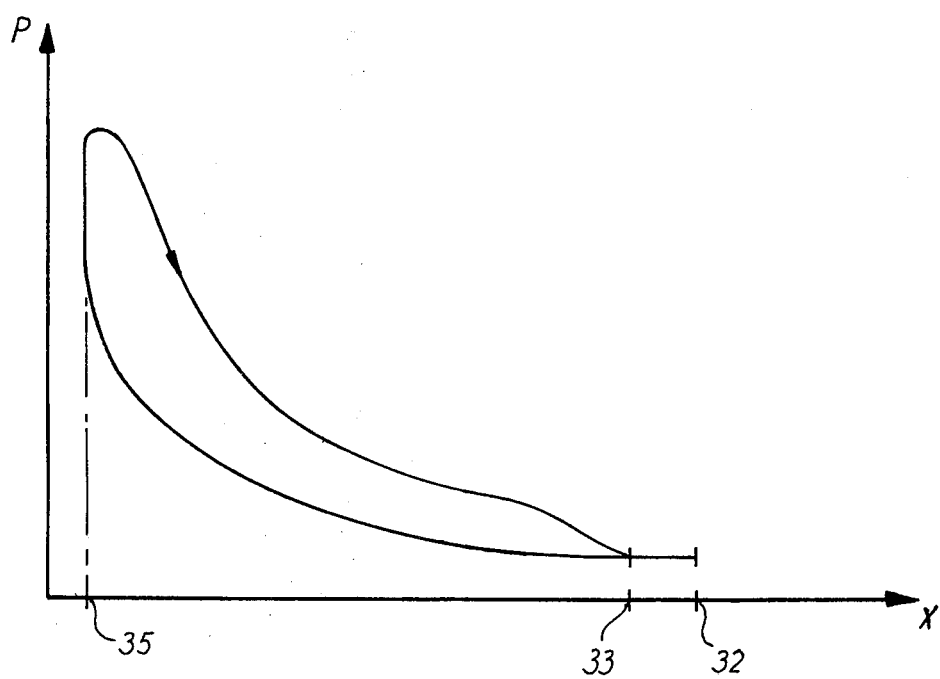
FIG. 4 is an indicator diagram or a graph from one of the cylinders of the engine.

As mentioned above piston travel markings are provided in the shape of teeth 13 and grooves 14 on a length of the telescopic tube 9, which length is slightly shorter than the stroke of the piston 3. The lowermost tooth 13 is aligned with the sensor 15 when the piston is positioned just beneath the top dead centre. In the opposite end of the telescopic tube there is as mentioned above a marking-free region which in practice may correspond to an angular displacement of the crankshaft 7 of approximately 25 degrees on each side of the bottom dead centre. Thus the sensor 15 generates no signals during this part of the piston travel. Referring to FIG. 4 this part of the piston travel corresponds to the piston travel between the bottom dead centre 32 in the indicator diagram and a point 33 in which interval the pressure in the combustion chamber 11 is practically constant, as the scavenging air ports 34 of the cylinder, cf. FIG. 1, have been opened during the expansion stroke by the piston in advance of the point 33 and similarly are not closed during the compression stroke until the piston has passed this point 33 by some distance. Therefore, no error is introduced in the calculation of the mean indicated pressure, if the field in the diagram between the points 32 and 33 is neglected.

The delay circuit 29 is set to give a time lag, which is greater than the maximum time interval between two position signals delivered from the sensor 15 within that section of the telescopic tube, in which the marking teeth 13 are provided. Hence, no output signal will emanate from the delay circuit 29 during this part of the piston travel. On the other hand, in the marking-free region between the points 32 and 33 of the indicator diagram the delay circuit 29 will deliver a signal to the OR-gate 31 which then yields an output signal and shifts the switch 27 to the other input terminal of the processor 28. The switching at the top dead centre is accomplished in that the counter 30 is adjusted to yield an output signal when it has received from the pulse shaping circuit 24 a number of signal pulses corresponding to twice the number of teeth 13 on the telescopic tube 9 (twice the number because, as mentioned before, two position signals are generated by each passage of a tooth). The counter 30 starts in response to the previous switching at the bottom dead centre and is reset when delivering its output signal to the OR-gate 31.

The processor 28 processes as mentioned above the values accumulated in its stores of the pressure in the combustion chamber 11 and reads out once during each operating cycle, e.g. concurrently with one of the changes of sign, the result of the calculation, which result is visualized on the display means 36 associated with the apparatus. At the same moment the processor 28 is reset and is thus ready for the subsequent operating cycle.

Due to the fact that marking teeth 13 are provided in close proximity to that location on the telescopic tube 9, which corresponds to the top dead centre of the piston, and further because of the possiblity of carrying out a fine adjustment of the position of the sensor 15 relative to the teeth it is possible to sense or measure the pressure in the combustion chamber 11 in close proximity to the top dead centre. Here the maximum positional error amounts to approximately one half tooth spacing or pitch, which corresponds to an error in the mean indicated pressure of about 2 per thousand in the case of an engine having a stroke of 1600 mm and the above mentioned tooth pitch of 6 mm.

In the case of an engine of the type just mentioned above having a 1600 mm stroke a marking-free region of 3 mm on each sie of the top dead centre corresponds to an angular displacement of the crankshaft of 8.8°, which is substantially less than the angle of 50° at the bottom dead centre where the change of sign occurs under the control of the delay circuit 29. Provided that the measuring apparatus thus described has to operate only within such an interval of the rotational speed of the engine, that the maximum rpm. is about three times the minimum rpm. it is then possible by selecting a magnitude of the time lag provided by the delay circuit 29, which at the maximum rpm. corresponds to more than three times 8.8°, i.e. an angular displacement of about 27° of the crank — and at the same time corresponds to less then 50° — to ensure that the delay circuit 29 does not release a change of sign at the top dead centre, but solely at the bottom dead centre. If the apparatus is to be utilized at rotational speeds within a substantially larger interval then the time lag can be made dependent on the rotational speed of the engine, e.g. by converting the output signal of the amplifier 23 in a frequency/voltage converter to a frequency dependent voltage, the peak value of which is utilized in the delay circuit.

It might be possible to control the change of sign at the top dead centre in a similar way by means of a separate delay circuit. Seeing that the time lag of this delay circuit has to be substantially shorter than at the bottom dead centre due to the smaller crank angle available for the change of sign, it will in general be required to let said time lag be dependent on the rotational speed of the engine. By application of a delay circuit instead of a counter the change of sign at the top dead centre becomes independent of the accuracy with which the markings have been executed.

It will be appreciated that the processing unit 28 may in a well-known manner be adapted to indicate desired instantaneous values of the pressure in the cylinder chamber corresponding to preselected points on the indicator diagram of FIG. 4, e.g. the compression pressure and the maximum combustion pressure. The processing unit 28 of the apparatus with its directly associated electronic components will generally be common to the entire engine whereas each cylinder has a pressure transducer 10 and a sensor 15 of its own which may be manually connected to and disconnected from the remaining part of the apparatus.

In calculating the mean indicated pressure it is possible when desired to perform the integration (summation) of the cylinder pressure values over a number of successive revolutions of the crankshaft — instead of only one revolution as hereinbefore described — and then to calculate a mean value in the calculating unit 28. This unit 28 and the display unit 36 may also be adapted to show separately for instance the magnitude of the expansion work (the area beneath the expansion curve of FIG. 4) and the compression work. Further the unit 28 may also be combined with an oscilloscope, which records directly an indicator diagram displaying the cylinder pressure as a function of the piston travel or as a function of time during an operating cycle. The apparatus may also be adapted to generate an alarm indication in the case of faults occurring, e.g. by registration of absurd values of measure etc.

What we claim is:

1. In an apparatus for measuring instantaneous values of pressure in the cylinders of a reciprocating engine and for computing the mean indicated pressure by integration of the pressure as a function of the piston travel; the apparatus including transducer means for sensing said pressure at moments determined by sensor means cooperating with markings provided on a part of the drive system of the engine and electronic calculator means to which said transducer means and said sensor means are coupled, the improvement comprising a set of markings provided for each cylinder in said engine, said markings being provided on a part (9) of the engine rigidly connected to the piston (3) belonging to the cylinder and which effects a reciprocating movement synchronous with the movement of the piston and said markings substantially covering only that part of the piston travel in which the pressure in the cylinder changes appreciably.

2. Apparatus as claimed in claim 1, and including for each cylinder a telescopic tube ()) for carrying piston coolant, wherein said markings (13) are provided on said telescopic tube (9).

3. Apparatus as claimed in claim 2, wherein said markings are constructed as equidistantly disposed teeth (13) of uniform width which are provided on the outer surface of said telescopic tube (9), and wherein said sensing means (15) is of an inductive type.

4. Apparatus as claimed in claim 2, wherein said sensing means (15) is mounted in the wall of a packing sleeve (18) through which said telescopic tube (9) extends into the engine, and which sleeve is centered by means of said tube.

5. Apparatus as claimed in claim 4, wherein said sensing means is mounted eccentrically and rotatably in an insert (17) in the wall of said packing sleeve (18).

6. Apparatus as claimed in claim 1 for application in a two-stroke engine, wherein that said machine part (9) having said markings (13) is free from markings in a longitudinal region adjacent the position, which corresponds to the bottom dead centre (32) of the piston, and wherein said electronic calculator means comprises a switch means (27) for changing, during the passage of said marking-free region, the sign of the measuring value originating in said transducer means (10) and a counting means (30) for changing again said sign of the measuring value after having received a predetermined number of signal pulses from said sensing means (15).

7. Apparatus as claimed in claim 6, wherein said switch means (27) is controlled through an OR-gate means (31) having two input terminals connected to said counting means (30) and to a delay circuit means (29), respectively.

8. Apparatus as claimed in claim 7, wherein the time lag of said delay circuit means (29) depends on the rpm. of said engine.

9. Apparatus as claimed in claim 6, wherein said marking-free region (32-33) corresponds to an angular displacement of the crankshaft of about 25° to each side of the bottom dead center.

* * * * *